Feb. 9, 1960 H. A. WILSON 2,924,245
PIPE LINE FOR HOT FLUIDS AND METHOD OF CONSTRUCTING SAME
Filed Oct. 1, 1958
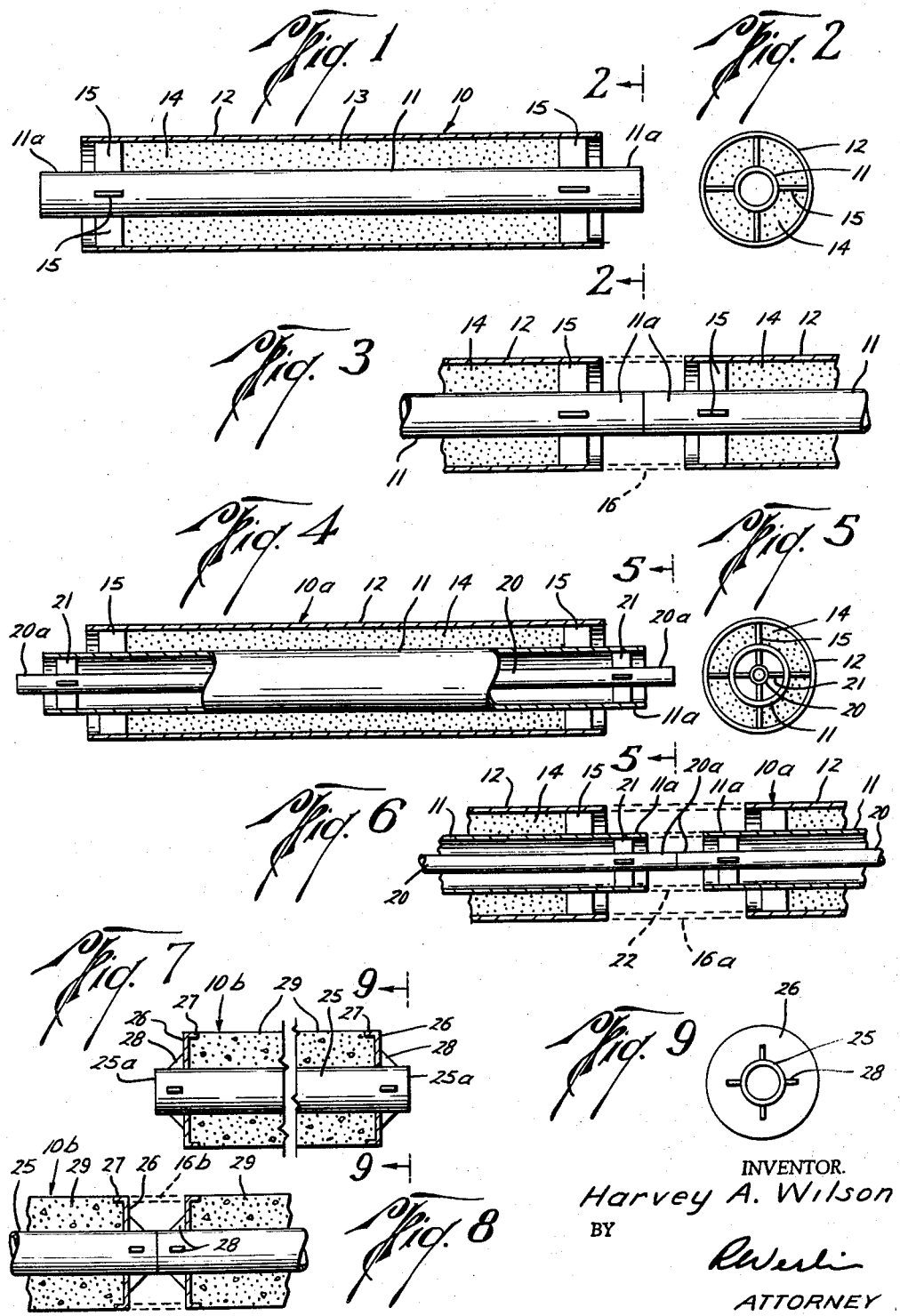
INVENTOR.
Harvey A. Wilson
BY
ATTORNEY

United States Patent Office 2,924,245
Patented Feb. 9, 1960

2,924,245

PIPE LINE FOR HOT FLUIDS AND METHOD OF CONSTRUCTING SAME

Harvey A. Wilson, Brazoria, Tex.

Application October 1, 1958, Serial No. 764,542

18 Claims. (Cl. 138—64)

This invention is directed to pipe lines for the transmission of hot fluids and to a method of constructing same.

This invention, while generally applicable to pipe lines for conducting various hot liquids, is particularly applicable to a pipe line designed for conveying molten sulfur from a mine to a storage or collection point remotely located with respect to the mine. By the well-known Frasch method, the sulfur is heated in the underground deposits to a temperature at which it melts and is then produced in molten form from the underground deposits and pumped or caused to flow through pipe lines to storage vessels or vats where it is allowed to solidify. The relatively high temperature at which the sulfur is produced, namely, about 320° F., is maintained at the surface in order to maintain it in liquid condition. Such high temperature necessarily requires the provison, in the pipe lines conveying the sulfur from the mine to storage, of suitable expansion joints to accommodate expansion and contraction of the line, particularly when it is initially heated to the sulfur melting temperature. Such expansion joints are sources of considerable trouble, being susceptible to leakage, require considerable maintenance, and involve relatively complicated structures which add considerably to the expense of the line.

Where the sulfur mine is located on land, the sulfur-conveying pipe lines, while subject to the afore-mentioned difficulties, will ordinarily be relatively convenient for repair and maintenance. However, recently important deposits of sulfur have been discovered in underwater locations, particularly in the Gulf of Mexico, and it has become highly desirable to provide pipe lines for conveying the melted sulfur, as it arrives at the surface of the mine in the off-shore locations, to storage locations on shore, a distance frequently of many miles from the mines. Since such a pipe line will necessarily have to be located beneath the surface of the Gulf, and generally in the land bottom, it is obvious that repair and maintenance will present great difficulties. Moreover, since steel pipe at 320° F. will elongate about 20 inches per 1000 feet, a line several miles long will normally require several large expansion joints and the employment of effective expansion joints in such a line raises very serious construction and operational difficulties.

The present invention, therefore, has for its principal object the provision of a novel form of pipe line construction which is particularly adapted to the transmission of hot fluids, such as the molten sulfur discussed above, and which will obviate the principal disadvantages common to conventional hot pipe line constructions.

Important objects are: To provide a pipe line construction which will eliminate the need for expansion joints; which can be laid with minimum of difficulty; and which can be repaired in much the same manner as any conventional pipe line.

The primary concept of the present invention is to construct or lay a pipe line which has been stretched or pre-expanded to substantially the length which it will occupy when engaged in transmitting the hot fluid at the desired operating temperature, in order that when the line is put into service, it can be employed to transmit the heated fluids without requiring the expansion joints and other cumbersome and troublesome devices commonly required for accommodating the expansion of the line which occurs by reason of the elevated temperatures of the fluids being transmitted through the line.

In accordance with one embodiment of the present invention, the pipe line may be constructed from pre-constructed sections or units, each unit being constructed in such a manner to maintain it in pre-expanded condition, and thereafter joined with similarly constructed sections or units to form the final continuous pipe line.

In accordance with this invention, each section of the fluid conductor pipe is elongated, as by heating or by mechanical stretching, to the length at which it would occupy when raised to the temperature of the fluid which will be transmitted therethrough. Since the coefficient of expansion of pipe metals are known, the amount of elongation corresponding to a particular temperature may be easily calculated. When the conductor pipe section has been thus elongated or pre-expanded, a compression member of suitable form will be secured at longitudinally spaced points to the pipe section in a manner to prevent the pipe section from retracting when the elongation force is released, as when the pipe is allowed to cool to normal temperatures. In short, the pipe line sections or units, in accordance with this invention, each comprises a pre-stretched or pre-expanded conductor section and a compression member secured thereto in a manner to maintain the conductor pipe section at its pre-extended length.

The compression member employed in accordance with a preferred embodiment of this invention will be a pipe section of larger diameter than the conductor pipe section and concentrically disposed about the latter. However, the compression member may comprise other types of rigid structural elements, such as steel bars or structural shapes capable of taking the required degree of compression, or such compression members may comprise a concrete sleeve disposed about the exterior of the pre-expanded conductor pipe and held in end compression between a pair of collars fixedly secured to the conductor pipe sections, and adapted to bear against the ends of the concrete sleeves, when the pipe is in its pre-extended condition.

In most cases, it may be desirable to install in the bore of the conductor pipe a smaller diameter auxiliary pipe through which high temperature steam may be circulated in order to maintain the fluid being conveyed at the desired temperature, or to re-melt the fluid, should it solidify as a result of cooling. The present invention contemplates the inclusion in the pipe line units or sections of such auxiliary pipes which will likewse be pre-expanded and secured against contraction in a manner similar to the main conductor pipe.

Other and more specific objects and advantages of this invention will become apparent from the following detailed description when read in conjunction with the accompanying drawing which illustrates several useful embodiments in accordance with this invention.

In the drawing,

Fig. 1 is a longitudinal sectional view of a pipe line section or unit constructed in accordance with one embodiment of this invention;

Fig. 2 is an end elevation taken along line 2—2 of Fig. 1;

Fig. 3 is a longitudinal sectional view illustrating the manner in which two of the pipe line units illustrated in Fig. 1 are joined into a pipe line;

Fig. 4 is a view generally similar to Fig. 1 of another embodiment of this invention wherein each pipe line unit includes an auxiliary pipe line installed in the bore of the main conductor pipe section;

Fig. 5 is an end elevation along line 5—5 of Fig. 4;

Fig. 6 is a longitudinal, partly sectional, view of the manner in which two of the pipe line units illustrated in Fig. 4 may be joined in forming a pipe line;

Fig. 7 is a longitudinal, partly sectional, view of still another embodiment of a pipe line unit construction in accordance with this invention;

Fig. 8 is a view showing the manner of joining together two sections of the type illustrated in Fig. 7; and Fig. 9 is an end elevation taken along line 9—9 of Fig. 7.

Referring to the drawing, and particularly to the structure illustrated in Figs. 1, 2 and 3, there is shown a pipe line unit or section, designated generally by the numeral 10 which comprises a length of a metallic conductor pipe 11, of any desired size, for conveying a hot fluid. Pipe section 11 is concentrically disposed within a larger diameter casing 12. The annular space 13 between pipe section 11 and casing 12 may be filled with suitable heat insulation 14 in order to prevent the loss of heat from pipe 11 when the latter is in use. A plurality of radial lugs 15 are initially rigidly secured, as by welding, to pipe 11 at longitudinally spaced points spaced a short distance from the ends of pipe section 11 providing the end portions 11a. Pipe section 11 is made somewhat longer than the surrounding section of casing 12 so that the end portions 11a will project from the opposite ends of casing 12, as illustrated. The longitudinal spacing of lugs 15 is such that when conductor pipe section 11 has been positioned in casing 12, the lugs will be disposed a short distance inwardly of the opposite ends of casing 12. The conductor pipe section will be heated in any suitable manner, as by passing hot gases of combustion therethrough, in order to heat pipe section 11 to a temperature corresponding to, or preferably slightly above, the temperature of the fluid which is to be conducted through pipe 11. In the case of a sulfur transmission line, this temperature will be generally about 320° F. When pipe 11 has attained this temperature, the outer ends of lugs 15 will be rigidly secured to casing 12, preferably by welding, thereby rigidly securing pipe section 11 at points adjacent its opposite ends to the opposite end portions of casing 12. Pipe section 11 may now be allowed to cool, but since it is rigidly secured at longitudinally spaced points to casing 12, the major portion of pipe 11 between lugs 15 cannot retract and will thus be placed in tension, the tensile force in pipe 11 being taken in compression by casing 12 which then becomes a compression member resisting the retraction of pipe section 11. End portions 11a, being free, will retract in accordance with the temperature reduction.

By this described construction of pipe line unit 10, it will be seen that when fluid at the operating temperature is passed through pipe 11, no further expansion will occur but, instead, the tension introduced into the pipe by the pre-elongation will be relieved.

It will be evident that the described procedure for constructing a unit 10 may be modified in various ways while still obtaining the desired pre-extended conductor pipe structure. For example, the lugs 15 at one end of the unit may be rigidly secured both to the pipe section and to the surrounding casing before any heating or stretching of pipe 11 occurs. In this case, the elongation will all occur in the opposite free end of the pipe, and the lugs 15 carried by the free end may, after the desired elongation is attained, be secured to casing 12. The lugs 15 may be of any suitable shape and arrangement adapted to assure a sufficiently strong connection between pipe 11 and casing 12 to withstand the forces exerted between these members.

Fig. 3 illustrates the manner in which a pair of the pipe line units 10 may be joined in constructing a pipe line from these units. Two of the units will be co-axially aligned so that the projecting ends 11a will be in abutting position. End portions 11a will then be heated in any suitable manner until these portions have attained the anticipated operating temperature of the line, whereupon they will be welded together. If desired, the end portions 11a may first be welded together and then heated to the elongating temperature. It will be noted that it is unnecessary to re-heat the major portion of pipe 11, since this will already be in extended condition, but it is only necessary to re-heat the projecting end portions 11a in order that the spacing between the adjacent ends of the casings 12 will be that corresponding to the length of the joined end portions 11a when the line has been heated to its operating temperature. While end portions 11a are in their heated elongated condition and after they are welded, a filler section 16, having the same diameter as casing 12, will be installed about the joined end portions 11a between the spaced ends of the casings 12. This filler section 16 may be made from an appropriate length of casing 12 split longitudinally (not shown) so that it may be placed about the pipe end portions 11a. Suitable heat insulation may first be placed about the joined end portions 11a and then the filler section 16 placed around the end sections and the insulation. The portions of the filler section will then be rigidly secured, as by welding, to each other and their ends to the adjacent ends of the adjoining casings 12.

When a filler section 16 has thus been welded between the ends of the casings, enclosing the adjoined portions 11a, and the latter are allowed to cool again, it will be seen that filler section 16 will become a part of the compression member formed by casings 12 and will, together with the latter, resist retraction of end portions 11a, as well as pipe sections 11.

The described operation of joining the pipe line units to one another will be repeated as the line is extended until a line of the desired length has been completed.

The relative sizes of casing 12 and pipe 11 may, of course, be varied widely. For conveying molten sulfur, casing 12 may suitably be 16 inch O.D. steel pipe and conductor 11 may be 8⅝ inch O.D. steel pipe. This will allow for about 4 inches of heat insulation 14 to be placed in annular space 13.

It will be understood that external coating and wrapping may be applied, as in the case of any other pipe line, in order to protect casings 12 from corrosion or other conditions encountered in service. The coating and wrapping may be applied continuously as the line is laid or the individual units may be coated and wrapped before installation in the pipe line, the joint portions being coated and wrapped after the connections are made.

When the entire line has been completed, as described, it will be seen that since the hot fluid conductor 11 will be in its pre-extended condition, when the hot fluid—for example, molten sulfur—is introduced into the line and caused to flow therethrough, no further expansion will take place. In fact, the tension in pipe 11 will be relieved, hence no danger of breaking the line will occur. If, for any reason, the conductor pipe should cool, the compression member formed by casing 12 will take up the retractive forces and prevent any contraction of conductor 11, which would otherwise tend to rupture the latter. It will be seen, therefore, that the described construction eliminates the need for conventional expansion joints and their attendant complexities and disadvantages.

With a construction of the kind described, since each of the units is individually pre-stretched, it will be seen that if any one or more of the units 10 of the pipe line should rupture or leak, or otherwise become defective, the defective portion may be cut out without changing the pre-stretched character of the remainder of the conductor pipe, and a new section may be installed in the same manner previously described, by pre-heating only those portions of the joints which will have lost their pre-stretched condition by reason of their having been severed between points at which they are rigidly secured to the outer casing or compression member.

Figs. 4, 5 and 6 illustrate an embodiment of a pipe line unit 10a in which an auxiliary heating line 20, smaller in diameter than conductor pipe 11 and usually referred to as a "gut" line, is shown installed concentrically in the bore of a conductor pipe 11. In this embodiment, the same procedure is employed for making up the individual pipe line units, except that the auxiliary pipe 20 will be cut to lengths somewhat longer than the lengths of conductor pipe 11 so that the opposite end portions 20a of the sections of pipe 20 will project a short distance beyond the opposite ends of the related section of conductor pipe 11. Pipe 20 will have radially extending lugs 21 secured to the exterior thereof at points which will be located just inside the ends of portions 11a of conductor pipe 11 when pipe 20 is properly positioned in the bore of pipe 11.

Both pipes 11 and 20 will be inserted in casing 12 in the relative positions illustrated in Fig. 4 and will be heated simultaneously, as by passing hot combustion gases through the bores thereof until both have attained the projected operating temperature of the line. Thereupon, lugs 21 will be rigidly secured to pipe 11 and lugs 15 to casing 12. Insulation 14 will preferably have been put in place in the annulus between pipe 11 and casing 12. When the unit thus constructed is allowed to cool, pipes 11 and 20 will both be in tension, functioning as a unit, and casing 12 will serve as the compression member for absorbing the retractive forces in both. By this described construction, pipes 11 and 20 will be unable to retract relative to each other and to casing 12 and will thus be maintained in tension in their desired pre-extended position.

Fig. 6 illustrates the manner in which two of the pipe line units 10a may be joined in forming a pipe line. The procedure is substantially identical with that described for joining two of the units 10, but is conducted in two stages.

End portions 20a and 11a are both heated to the line-operating temperature or slightly higher, whereupon end portions 20a are welded together and a filler section 22 of the same diameter as pipe 11 is preheated and installed concentrically about the joined end portions 20a of pipes 20 and between the adjacent ends of pipes 11 and rigidly welded thereto. Thereafter, and while the joined ends of pipes 20 and pipes 11, including filler section 22, are maintained in their heated and extended condition, a filler section 16a is installed between the adjacent ends of casings 12, in the manner previously described, heat insulation being placed about the joined ends of pipe 11 before completing the closure with filler 16a. Additional units 10a will be added to the pipe line in the same manner until the line is completed. Coating and wrapping of the line may be applied as previously described.

When placed in service, a line constructed in accordance with the embodiment of Figs. 4, 5 and 6 will be equipped with the gut line 20 through which steam or other heating fluid may be conducted to maintain the desired operating temperature on the material flowing through conductor 11.

Repair of a pipe line constructed in accordance with the embodiment of Figs. 4, 5 and 6, may be effected in substantially the same manner as described in connection with the embodiment of Figs. 1–3, the replacement section being installed by following the steps previously described for connecting the pipe line units 10a to each other.

In the case of a molten sulfur pipe line of the dimensions previously described, auxiliary pipe 20 may be made of 1½ inch steel pipe.

In the embodiment illustrated in Figs. 7 to 9, each of the pipe line units, designated generally 10b, comprises a conductor pipe 25 which has longitudinally spaced, radially extending, generally circular flanges 26 rigidly secured to the exterior thereof adjacent its opposite ends. Each of the flanges 26 has substantial radial width and may have peripheral lips 27 turned toward each other. A plurality of angularly spaced gusset plates 28, or other suitable bracing elements, may extend between the outer faces of flanges 26 and the exterior of pipe 25 to strongly brace flanges 26 against bending toward the ends of pipe 25. Flanges 26 serve as buttresses for the ends of a sleeve 29 constructed of concrete which serves as the compression member for holding pipe 25 in pre-extended condition.

The units 10b may be constructed in the following manner: a length of pipe 25 fitted with the flanges 26 is placed in any suitable and generally conventional type of enclosing form or mold (not shown) adapted to shape the sleeve 29. Pipe 25 is then heated to a temperature such as to expand and lengthen it to the dimensions which it will occupy under the anticipated operating conditions, and will be maintained at this temperature while a suitable concrete mix is poured into the form about pipe 25 and allowed to harden to form the concrete sleeve 29. It will be understood that a layer of suitable heat insulation will have been placed about conductor pipe 25 before the concrete mix is applied thereto to protect the concrete against the effect of the high temperature while the sleeve is being cast, and to serve as insulation in normal operating service. The concrete mix employed may be of any suitable and known character as will provide high resistance to axial compression when the concrete has hardened.

When sleeve 29 has hardened and pipe 25 is allowed to cool, sleeve 29 will function as a compression-taking member for the tensile forces in pipe 25, acting through the bearing of flanges 26 on the ends of the concrete sleeve and will thus maintain pipe 25 in its extended condition. It will be seen that sleeve 29 may be pre-cast and slipped over one end of pipe 25, one of the flanges 26 being removed for this purpose. When the sleeve is against the other buttress flange and while pipe 25 is in its stretched condition, the second buttress flange can be welded in place to pipe 25 and against the free end of the sleeve to complete the structure. Sleeve 29 may be made with a bore larger in diameter than the exterior of pipe 25 for the introduction of heat insulation about pipe 25.

As seen in Fig. 8, units 10b may be joined end-to-end substantially in the manner previously described, to form a pre-extended pipe line for transmission of hot fluids. As in the previous embodiment end-portions 25a of the adjoining units will be placed in abutting relation and welded securely together. The connected end portions will be heated to the operating temperature of pipe line 25, and while the connected end portions are in the extended position due to the temperature, a filler section 16b will be installed in the space between the adjacent ends of sleeves 29.

Filler section 16b will more conveniently be a length of a steel pipe having substantially the same external diameter as sleeves 29 and will be put in position about the connected ends 25a in the same manner described in connection with the previously described embodiments, being finally welded securely to the flanges 26 and thus forming a compression member between the ends of the sleeves 29 which will absorb the tension in end portions 25a when the latter are cooled. The annular space between filler section 16b and pipe ends portions 25a may be filled with suitable heat insulation. Filler section 16b may also be constructed of concrete if desired.

The concrete mix forming sleeve 29 will have some heat insulating properties, but may have incorporated in the mix, heat insulating material in order to additionally prevent heat loss from pipe 25. Also, it will be understood that other insulation may be placed about the conductor pipe, as noted. The use of concrete as the compression member for the pipe line has additional advantages, particularly where the line is to be laid through water bodies, in that concrete will be resistant to corrosion or other conditions deleterious to metal pipe and will provide a weighting element which will help keep the pipe line submerged.

It will be evident that a "gut" line corresponding to pipe 20 may be made up in each of the sections 10b in substantially the same manner as described in connection with the embodiment illustrated in Figs. 3 to 5, and pipe line units, including such auxiliary pipe, may be connected together in the same manner as described in connection with Fig. 6.

Instead of pre-stretching the inner conductor by means of heat, as described in all of the several above-described embodiments, mechanical means, such as hydraulic jacks, may be secured to the ends of the pipe sections and employed to stretch the conductor pipe to the desired length and to maintain it in its elongated condition until the compression members have been put in place and effectively secured to the conductor pipe.

It will be understood that numerous alterations and changes may be made in the details of the illustrative embodiments within the scope of the appended claims but without departing from the spirit of this invention.

What I claim and desire to secure by Letters Patent is:

1. A hot fluid transmission pipe line, comprising, a fluid conductor pipe which has been pre-elongated to the length corresponding substantially to that which it will normally occupy at the pipe line operating temperature, and means operably secured to said pipe to prevent retraction of said pipe at temperatures lower than said operating temperature.

2. A hot fluid transmission pipe line, comprising, the combination of fluid conductor pipe which has been pre-elongated to a length corresponding substantially to that which it will normally occupy at the pipe line operating temperature, and rigid compression-taking means fixedly secured at longitudinally spaced points to said conductor pipe while it is at said pre-elongated length whereby to prevent retraction of said conductor pipe at temperatures lower than said operating temperature.

3. A hot fluid transmission pipe line according to claim 2 wherein said compression-taking means comprises a second pipe larger in diameter than said conductor pipe and concentrically disposed about the latter.

4. A hot fluid transmission pipe line according to claim 3 having heat-insulating means disposed between the conductor pipe and said second pipe.

5. A hot fluid transmission pipe line according to claim 2 wherein said compression-taking means comprises a concrete sleeve member concentrically disposed about said conductor pipe.

6. A hot fluid transmission pipe line, comprising, a fluid conductor pipe, an auxiliary pipe smaller in diameter than said conductor pipe and concentrically disposed in the bore of said conductor pipe, both said pipes being pre-elongated to the lengths which they will occupy at the pipe line operating temperature, means fixedly securing the auxiliary pipe at longitudinally spaced points to the conductor pipe while both are at said pre-elongated lengths to prevent relative longitudinal movement therebetween, and rigid compression-taking means fixedly secured at longitudinally spaced points to said conductor pipe while the latter is at said pre-elongated length whereby to prevent retraction of said conductor pipe at temperatures lower than said operating temperature.

7. A hot fluid transmission pipe line according to claim 6 wherein said rigid compression-taking means comprises a third pipe larger in diameter than said conductor pipe and concentrically disposed about the latter.

8. A hot fluid transmission pipe line according to claim 6 wherein said compression-taking means comprises a concrete sleeve member concentrically disposed about said conductor pipe.

9. A pipe line unit for incorporation into a hot fluid transmission pipe line, comprising, a unit section of a fluid conductor pipe which has been pre-elongated to the length corresponding to that which it will normally occupy at the pipe line operating temperature, and a rigid compression-taking member fixedly secured to said section at longitudinally spaced points adjacent the ends of said section while the latter is at said pre-elongated length whereby to prevent retraction of said conductor pipe at temperatures lower than said operating temperature.

10. A pipe line unit according to claim 9 including a section of an auxiliary pipe smaller in diameter than said conductor pipe and disposed concentrically in the bore of the conductor pipe, said auxiliary pipe section being also pre-elongated to the length which it will occupy at said operating temperature, and means fixedly securing said auxiliary pipe section at longitudinally spaced points to said conductor pipe section while both said pipe sections are at said pre-elongated lengths.

11. A pipe line unit for incorporation into a hot fluid transmission pipe line, comprising, a unit section of a fluid conductor pipe which has been pre-elongated to the length corresponding to that which it will normally occupy at the pipe line operating temperature, radially projecting annular buttress elements rigidly secured to longitudinally spaced points adjacent the opposite ends of said pipe section, and a concrete sleeve member disposed about the exterior of the pipe section in compression between said buttress elements while said pipe section is at said pre-extended length whereby to prevent retraction of said pipe section at temperatures lower than said operating temperature.

12. The method of constructing a hot fluid transmission pipe line, comprising, elongating a fluid conductor pipe from its normal length at atmospheric temperatures to a length corresponding to that which said pipe will occupy at the hot fluid-transmitting temperature, and fixedly securing a rigid compression-taking member to longitudinally spaced points on said conductor pipe while the latter is in its elongated condition whereby to prevent retraction of said conductor pipe in response to temperatures lower than said operating temperature.

13. The method of constructing a hot fluid transmission pipe line, comprising, heating a fluid conductor pipe to substantially the anticipated operating temperature of the pipe line whereby to pre-elongate said pipe to the length corresponding to that which it will occupy at said temperature, and while said pipe is at said pre-elongated length fixedly securing a rigid compression-taking member to longitudinally spaced points on said pipe positioned thereon to prevent retraction of said pipe in response to temperatures lower than said operating temperature.

14. The method of constructing a hot fluid transmission pipe line, comprising, elongating a fluid conductor pipe from its normal length at atmospheric temperatures to a length corresponding to that which the conductor pipe will occupy at the hot fluid-transmitting temperature, concentrically disposing about said conductor pipe a pipe larger in diameter than said conductor pipe, and fixedly securing said larger pipe to said conductor pipe at a plurality of longitudinally spaced points while said conductor pipe is at its elongated length whereby to positively prevent retraction of said conductor pipe in response to temperatures lower than said operating temperature.

15. The method of constructing a pipe line unit for incorporation into a hot fluid transmission pipe line, comprising, heating a section of a conductor pipe to the anticipated operating temperature of the pipe line whereby to pre-elongate said conductor pipe section to a length corresponding to that which it will occupy at said operating temperature, disposing a section of a larger diameter pipe concentrically about said conductor pipe section, fixedly securing said larger diameter pipe section to longitudinally spaced points on the conductor pipe section adjacent the ends of the latter while the latter is at said heated pre-elongated length whereby to prevent retraction of said conductor pipe section in response to temperatures lower than said operating temperature.

16. The method of constructing a hot fluid transmission pipe line from a plurality of pipe line units constructed in accordance with claim 15, comprising disposing said units in co-axial alignment with the ends of adjacent sections of said conductor pipe in abutting relation, rigidly securing the abutting ends to each other, heating the so-joined end portions of said conductor pipe sections to the anticipated operating temperature of said pipe line whereby to correspondingly elongate said end portions while correspondingly increasing the space between the adjacent ends of the sections of the larger diameter pipe which surround said conductor pipe, and while said end portions are elongated as aforesaid, installing in said space a filler section of said larger diameter pipe to form a rigid connection between said sections of larger diameter pipe.

17. The method of constructing a hot fluid transmission pipe line, comprising, elongating a fluid conductor pipe from its normal length at atmospheric temperature to a length corresponding to that which said pipe will occupy at a temperature substantially higher than said atmospheric temperature, and fixedly securing a rigid compression-taking member to longitudinally spaced points on said conductor pipe while the latter is in its elongated condition whereby to prevent retraction of said conductor pipe in response to temperatures lower than said higher temperature.

18. The method of constructing a hot fluid transmission pipe line, comprising, heating a fluid conductor pipe to a temperature substantially higher than atmospheric temperature whereby to pre-elongate said pipe to the length corresponding to that which it will occupy at said substantially higher temperature, and while said pipe is at said pre-elongated length fixedly securing a rigid compression-taking member to longitudinally spaced points on said pipe positioned thereon to prevent retraction of said pipe in response to temperatures lower than said higher temperature.

References Cited in the file of this patent

UNITED STATES PATENTS

| 2,611,567 | Williamson | Sept. 23, 1952 |
| 2,800,249 | Beckwith | July 23, 1957 |